United States Patent Office 2,932,887
Patented Apr. 19, 1960

2,932,887
METHOD AND ALLOY FOR BONDING TO ZIRCONIUM

Franklin D. McCuaig, La Grange, Ill., and Robert D. Misch, Whiting, Ind., assignors to the United States of America as represented by the United States Atomic Energy Commission No Drawing. Application September 8, 1958
Serial No. 759,831

4 Claims. (Cl. 29—504)

The invention relates to an alloy suitable for brazing the metal zirconium to itself and to the other metals and materials for which the need exists at the present time.

Zirconium metal, until quite recently regarded as a laboratory curiosity, has become a material of great importance in the fields of chemical and nuclear engineering due to a combination of outstanding properties. In the chemical field its great resistance to corrosion by nearly all reagents, together with its adequate physical strength, makes it very useful as a structural material for chemical retorts, reaction vessels, piping, heat exchangers, and the like; in the nuclear field its ability to withstand the various kinds of radiations present in nuclear reactors, together with its extremely small tendency to "poison" or interfere with the nuclear reaction within the reactor, makes it a preferred material for numerous reactor components, particularly in those reactors where chemical resistance to corrosion is required as well as resistance to radiation, such as reactors utilizing water, liquid sodium, potassium, or alloys of the last two named as absorbents for the energy generated.

Zirconium and its alloys can be successfully welded, but in certain applications welding, as compared to brazing, is inadequate; welding, which is essentially the fusing together of two pieces of metal, similar or dissimilar, by the application of heat alone necessarily makes use of some of the pieces to form the weld and consequently tends to alter the geometry of the pieces, whereas brazing, which in addition to heat introduces a third metal in the form of a meltable rod or insert of some kind to make the junction between the two joined pieces, has less of a tendency to deform them, can be carried out at lower temperatures, and in narrow places such as crevices inaccessible to the welding apparatus the meltable brazing insert can give a much stronger bond than can be made by welding, all of which can be quite important in the nuclear reactor art where accuracy of dimensions are a critical matter, far more so than in more conventional machines and articles of manufacture.

One common use made of zirconium in nuclear reactors is for cladding fuel rods, or furnishing metal covering bonded to the uranium or other fissionable metals and materials which supply the energy to such reactors in order to give such rods mechanical support, to prevent the escape of dangerous fission products formed during the reaction, as well as to give protection from corrosive attacks; it is more economical to clad such rods in continuous lengths and cut them to size rather than to cut them first to size and clad the individual lengths separately; therefore, some efficient brazing material is needed to seal off the unclad ends of rods resulting when continuous clad rod stock is cut into lengths, and it is one of the objects of this invention to supply this need.

Another problem in the construction of reactors is to make an efficient seal between zirconium clad fuel rods and "handles," usually of stainless steel, which are attached to the end of such rods to facilitate their being inserted and withdrawn into and from the reactor. Such a seal is especially necessary in reactors of the liquid heat absorbent type for rods having small thermocouples and lead wires thereto in an inner bore; such thermocouples are located at various points in the reactor core within selected rods to keep a check upon the temperature of the reactor and, by the use of a control mechanism, maintain the nuclear reaction at a desired level. Hitherto the line of junction between the zirconium cladding protecting a fuel rod proper and the stainless steel "handle" has been prone to leaks, permitting liquid sodium or other heat absorbent to creep along the interface between the handle and the rod into the thermocouple bore where it diffuses through the insulation protecting the thermocouple lead wires, causing short circuits which cancel out the very small voltages of the thermocouples and thereby endanger the oepration of the control mechanism of the reactor. An object of the present invention is to prevent such leaks.

The above are but two examples of the problems arising in the nuclear reactor field where zirconium or its alloys is employed and a firm leak-proof bond is needed between it and some other material, or with itself, without the geometrical distortion which welding is apt to cause; therefore, it is the general object of this invention to supply a suitable brazing alloy and a method of employing the same for bonding zirconium and its alloys to itself and to any of the metals and materials commonly used in the chemical engineering and nuclear engineering fields.

More particularly it is the object of the present invention to supply a suitable brazing alloy, and a method of using the same, for bonding zirconium and its alloys to a member of the class consisting of zirconium, zirconium alloys, iron, steel, stainless steel, uranium, ceramics, and cermets. Experiment has shown that the members of this class act alike in forming a bond when the alloy of this invention is used for bracing.

The invention consists of a brazing alloy, together with the method of using it, with the following metal constituents present by weight:

About 6 to 9% nickel, about 6 to 9% of a member of the group consisting of chromium, molybdenum, and tungsten, about 0 to 7.5% iron, balance zirconium.

A preferred species of the above is about 8% nickel, about 8% chromium, balance zirconium.

Another preferred species, preferably used when the material being brazed to the zirconium or zirconium alloy contains iron is about 6% nickel, about 6% chromium, about 6% iron, balance zirconium.

The above difference in species is more apparent than real since it has been found that regardless of which species is used to braze iron containing material, the brazed portion tends to result in the same percentages of components as the second preferred species due to interdiffusion of the metals toward an equilibrium; the second preferred species therefore represents only a more economical brazing alloy to use with iron or steel since the complete removal of iron is expensive and serves no purpose in this case since iron is bound eventually to diffuse into the bond in any case, which diffusion is desirably held to a minimum.

The percentage ranges given above are quite critical, and any excess or deficiency thereof results in an alloy which does not give a strong, leak-proof bond.

Specific examples of carrying out the invention are as follows:

Example I

A continuous length of Zircaloy II consisting essentially of about 1.5% tin, 0.12% iron, 0.10% chromium, 0.05% nickel by weight, balance zirconium, clad uranium fuel rod of about 1 cm. in diameter was cut into lengths of about 100 cm. The ends of the cut rods intended to be first inserted into a reactor were brazed in an argon atmosphere with the alloy of the invention, about 8% nickel, about 8% chromium by weight, balance zirconium; so as to cover them completely. Inspection showed that a tight, leak-proof bond had been formed between the rounded bead of brazing material and the cylindrical zirconium cladding layer covering the rods.

*Example II*

A uranium fuel rod clad with Zircaloy II and sealed at one end in the manner set forth in Example I, was bored along its axis from the unsealed end with a drill of about 0.15 cm. to a point about 52 cm. from the sealed end; a larger bore of about 0.9 cm., coaxial with first, was drilled in the rod from the same unsealed end to a depth of about 1 cm.; the larger bore was threaded with a tap and a double thermocouple of the furcated type with insulated leads was placed in the smaller bore; a stainless steel handle of modified cylindrical shape with a lower stud having threads matching those of said larger bore of the rod and with a bore in register with the smaller bore of the rod and of the same diameter, was screwed into the said larger bore and the thermocouple leads brought out through the smaller bore of the handle; the annular interface of junction between the Zircaloy cladding and the handle was then brazed with the alloy of the invention, about 6% nickel, about 6% chormium, about 6% iron by weight, balance zirconium, the brazing bead smoothed and the combined rod and handle placed in a nuclear reactor employing a liquid sodium-potassium alloy coolant or heat-absorbent flowing freely around said line of junction. An extended period of service revealed no leaks and visual inspection indicated that a permanent, leak-proof seal has been made by the alloy of the invention.

*Example III*

In order to test the alloy of the invention for use in a heat exchanger "header," or plate provided with numerous circular perforations for receiving cylindrical tubes at one end of a heat exchanger, a plate of the same thickness and with a perforation of the same size and shape as those used in such headers was fabricated of Zircaloy II and a short length of tube of the same material was inserted into the perforation. An annular tapered insert of the alloy of the invention set forth in Example I was inserted between the tube and the circular perforation, followed by heating so as to form a brazed seal therebetween; this assembly was then immersed in water at 650° F. for 500 hours, and then immersed in steam at 750° F. and 1500 p.s.i. for 400 hours. Inspection showed the seal between the tube and the plate to be intact and free of any corrosion.

While the above specific examples all relate to uses of the alloy of the invention in nuclear energy devices, the scope of the invention is not limited to that field; it is obvious to persons skilled in the chemical engineering art that in many chemical applications such as the heat exchanger described above the alloy of the invention would be very useful; for example the heat exchanger described could be employed wherever a tight, reliable, corrosion-resistant heat exchanger was needed, not necessarily when the materials to be handled were radioactive but merely when they were sufficiently corrosive and valuable to justify the expense of a heat exchanger constructed of zirconium metal. In both the nuclear engineering and chemical engineering fields new devices constructed of zirconium are being designed at a rapid rate, and in many, if not all of them, the alloy of the invention can be used to fabricate a stable, leak-proof bond while avoiding the dimensional distortion of welding procedures.

What is claimed is:

1. An alloy consisting essentially of about 6 to 9% nickel, about 6 to 9% of a member of the group consisting of chromium, molybdenum and tungsten, zero to about 7.5% iron by weight, and the balance zirconium.

2. An alloy consisting essentially of about 8% nickel, about 8% chromium by weight, and the balance zirconium.

3. An alloy consisting essentially of about 6% nickel, about 6% chromium, about 6% iron by weight and the balance zirconium.

4. The method of bonding a member of the class consisting of zirconium and zirconium alloys to a member of the class consisting of zirconium, zirconium alloys, iron, steel, stainless steel, uranium, ceramics and cermets comprising brazing the junction therebetween with an alloy consisting essentially of about 6 to 9% nickel, 6 to 9% of a member of the group consisting of chromium, molybdenum and tungsten, zero to about 7.5% iron by weight, balance zirconium.

References Cited in the file of this patent

UNITED STATES PATENTS 1,221,769     Cooper _____ Apr. 3, 1917